(12) United States Patent
Kondo

(10) Patent No.: US 7,766,097 B2
(45) Date of Patent: Aug. 3, 2010

(54) PORTABLE ELECTRIC POWER TOOL

(75) Inventor: Tomoyuki Kondo, Anjo (JP)

(73) Assignee: Makita Corporation, Anjo-Shi (JP)

(*) Notice: Subject to any disclaimer, the term of this patent is extended or adjusted under 35 U.S.C. 154(b) by 66 days.

(21) Appl. No.: 12/153,433

(22) Filed: May 19, 2008

(65) Prior Publication Data

US 2008/0302552 A1    Dec. 11, 2008

(30) Foreign Application Priority Data

Jun. 7, 2007    (JP) .............................. 2007-151149

(51) Int. Cl.
B25F 3/00 (2006.01)
B25D 17/00 (2006.01)

(52) U.S. Cl. .................. 173/217; 173/171; 173/213; 173/162.2; 310/50

(58) Field of Classification Search .................. 173/217, 173/171, 213, 162, 170, 162.1, 162.2; 310/47, 310/50
See application file for complete search history.

(56) References Cited

U.S. PATENT DOCUMENTS

| | | | | |
|---|---|---|---|---|
| 5,553,675 A * | 9/1996 | Pitzen et al. | ................ | 173/217 |
| 6,502,949 B1 * | 1/2003 | Horiyama et al. | ........... | 362/119 |
| 6,840,335 B1 * | 1/2005 | Wu | ............. | 173/217 |
| 7,243,734 B2 * | 7/2007 | Wu | ............. | 173/217 |
| 7,589,500 B2 * | 9/2009 | Johnson et al. | ............. | 320/134 |

FOREIGN PATENT DOCUMENTS

| | | | |
|---|---|---|---|
| AU | 2005100997 A4 | | 1/2006 |
| CA | 2 532 264 A1 | | 7/2006 |
| CN | 2762964 Y | | 3/2006 |
| CN | 1958242 A | | 5/2007 |
| DE | 20 2005 018 832 U1 | | 4/2006 |
| DE | 10 2005 052 428 A1 | | 5/2007 |
| FR | 2 880 735 A1 | | 7/2006 |
| FR | 2 880 735 B3 | | 10/2007 |
| GB | 2 422 047 A | | 7/2006 |
| GB | 2 422 047 B | | 7/2006 |
| GB | 2 432 036 A | | 5/2007 |
| IT | MI20062095 A1 | | 1/2007 |
| JP | A-10-296660 | | 11/1998 |
| JP | A-2003-297312 | | 10/2003 |
| JP | A-2007-125691 | | 5/2007 |

OTHER PUBLICATIONS

Oct. 15, 2009 Search Report issued in European Patent Application No. 08009486.5.
Chinese Office Action, Chinese Patent Office, Sep. 25, 2009.

\* cited by examiner

Primary Examiner—Paul R Durand
(74) Attorney, Agent, or Firm—Oliff & Berridge, PLC (57) ABSTRACT

A portable electric power tool powered by a battery pack, which includes: a motor that operates the tool; the housing that houses the motor; at least one elastic member that is supported by the housing; and a battery pack holder supported by the elastic member. The battery pack holder is provided with an engaging portion that is detachably engaged with the case of the battery pack and connecting terminals that are electrically connected to the output terminals of the battery pack installed by the engaging portion. Thus, vibration of the battery pack is prevented even when the electric power tool vibrates.

10 Claims, 6 Drawing Sheets

PORTABLE ELECTRIC POWER TOOL

CROSS-REFERENCE TO RELATED APPLICATION

This application claims priority to Japanese Patent Application No. 2007-151149, filed on Jun. 7, 2007, the contents of which are hereby incorporated by reference into the present application.

BACKGROUND OF THE INVENTION

1. Field of the Invention

The present invention relates to a portable electric power tool powered by a battery pack.

2. Description of the Related Art

In the portable electric power tool powered by a battery pack, the electric power tool and the battery pack vibrate relative to each other during the operation of the electric power tool, and the electric power tool or the battery pack may be damaged in some cases. There are also cases where contact failure occurs between output terminals of the battery pack and connecting terminals of the electric power tool connecting thereto.

Regarding the above-described problem, Japanese Patent Application Publication No. H10-296660 discloses a portable electric power tool wherein expansible elastic bodies are provided in a battery pack insert port of the electric power tool. The expansible elastic bodies contact with a battery pack attached to the battery pack insert port and prevent the battery pack from vibrating, which prevents thermal deformation of the electric power tool and the battery pack caused by frictional heat due to vibration.

Further, Japanese Patent Application Publication No. 2003-297312 discloses a portable electric power tool wherein a connecting terminal is slidably provided in a battery pack insert port of the electric power tool. In this electric power tool, the connecting terminal can vibrate together with the battery pack attached to the battery pack insert port, which prevents contact failure between the terminal of the electric power tool and the battery pack.

BRIEF SUMMARY OF THE INVENTION

According to the technique of Japanese Patent Application Publication No. H10-296660, relative displacement of the electric power tool and the battery pack occurs due to the deformation of elastic bodies. Therefore, relative displacement of the connecting terminals of the electric power tool and the output terminals of the battery pack also occurs, which leads to contact failure. Further, the elastic bodies are apt to be damaged during attaching/detaching the battery pack.

According to the technique of Japanese Patent Application Publication No. 2003-297312, vibration still occurs between the electric power tool and the battery pack during the operation of the electric power tool, which may damage the electric power tool or the battery pack. Particularly, when the battery pack experiences continuous strong vibration, a battery cell or an electrical circuit inside the battery pack may be damaged. As a result, problems arise in the form of premature battery cell deterioration, electrical short circuit and so forth.

The present invention, which solves the above-described problem, provides a technology that prevents a battery pack from vibrating during the operation of the electric power tool, without contact failure between the terminals of the electric power tool and the battery pack.

The electric power tool embodied by the present teachings is a portable electric power tool powered by the battery pack, including a motor that operates a tool, a housing that houses the motor, at least one elastic member that is supported by the housing, and the battery pack holder that is supported by the elastic member wherein: the battery pack holder is provided with an engaging portion that is detachably engaged with the case of the battery pack and connecting terminals electrically connected to the output terminals of the battery pack installed by the engaging portion.

The electric power tool has a constitution in which an elastic member is disposed between the housing that houses the motor and the battery pack holder that holds the battery pack, and the battery pack holder is connected to the housing via the elastic member. This constitution prevents vibration transmission to the battery pack holder or the battery pack, even when vibration occurs in the housing during the operation of the electric power tool. Without relative strong vibration between the battery pack holder and the battery pack, stable contact is assured between connecting terminals provided in the battery pack holder and output terminals of the battery pack.

According to this electric power tool, there is no contact failure between the terminals of the electric power tool or the battery pack, while vibration during the operation of the electric power tool is prevented.

In the above-described electric power tool, the housing preferably includes a housing body portion that houses the motor, and a grip portion that extends from the housing body portion. In this case, the battery pack holder is preferably connected to the tip of the grip portion via the elastic member.

According to this electric power tool, since the battery pack holder is disposed near the grip portion, the amount of force that is transmitted to the user from the electric power tool does not involve a significant increase, even when the battery pack holder moves with respect to the housing in a swinging manner. Therefore, the user can comfortably continue gripping the electric power tool.

In the above-described electric power tool, the elastic member is preferably surrounded by the housing and/or the battery pack holder.

According to the electric power tool, damage to the elastic member along with contact with an external object is prevented.

In the electric power tool, it is preferable that a projected portion be formed on either one of the housing or the battery pack holder, and an insertion opening into which the projected portion is inserted is formed the other. It is preferable that a flange portion be formed on the side surface of either one of the projected portion or the insertion opening, and a groove portion that houses the flange portion is formed on the other side surface. It is preferable that the elastic member be arranged between the flange portion and the groove portion.

According to the electric power tool, the battery pack holder is displacably connected to the housing in various directions, which exhibits a remarkable effect of preventing vibration transmission from the housing to the battery pack holder.

In the electric power tool, the elastic member is preferably formed of a material having rubber elasticity, such as elastomer. Note that the material having rubber elasticity is not limited to a rubber material, but may be a polymeric material having rubber elasticity.

The material having rubber elasticity can absorb relatively considerable deformation in response to an applied force. The elastic member that is formed of the material having rubber elasticity exhibits the additional remarkable effect of preventing vibration transmission from the housing to the battery pack holder.

In the electric power tool, a plurality of projections and/or depressions is preferably formed on the surface of the elastic member.

A plurality of projections and/or depressions formed on the surface of the elastic member enable further considerable deformation with respect to the applied force, which leads to the further remarkable effect of preventing vibration transmission from the housing to the battery pack holder.

DETAILED DESCRIPTION OF THE INVENTION

Main Features of an Embodiment of the Invention (Feature 1) The connecting terminals electrically connected to the output terminals of the battery pack are fixed on the battery pack holder. The connecting terminals fixed on the battery pack holder are connected to a trigger switch and a motor provided in the housing via lead wires.
(Feature 2) The elastic member is formed of rubber material.
(Feature 3) A plurality of projections is formed on the contact surface of the elastic member and/or the contact surface of the battery pack holder with the housing.
(Feature 4) The battery pack holder is formed of the same material as the housing.

A description will be given with reference to the drawings of the electric power tool on which the present invention is executed. The electric power tool of this example is a portable electric power tool used by the user in a gripping state, in particular, a fastening tool for fastening bolts.

Figure 1:
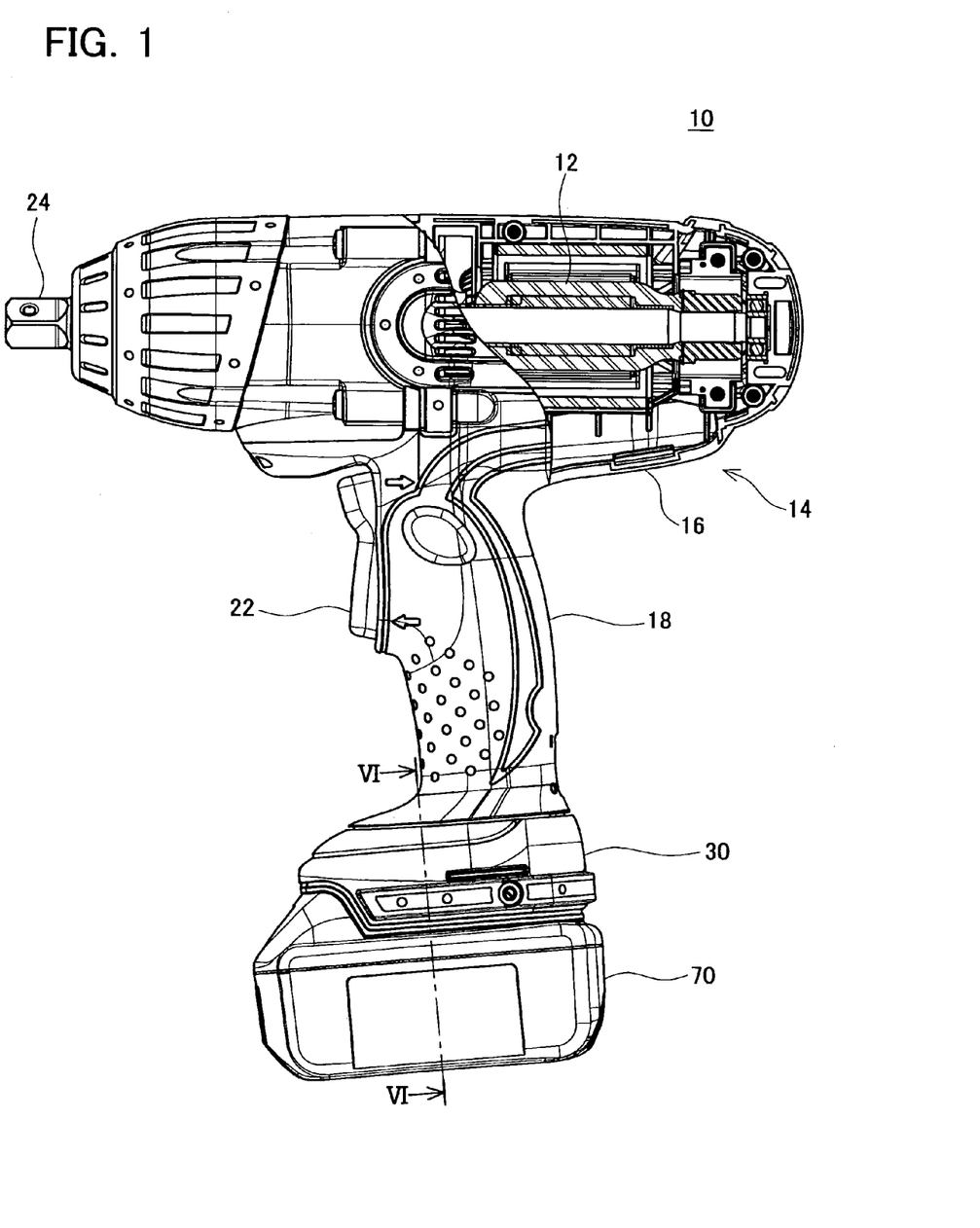
FIG. 1 is a side view showing the external view (partial sectional view) of the electric power tool.

FIG. 1 is the side view showing the external view (partial sectional view) of an electric power tool 10. As shown in FIG. 1, the electric power tool 10 includes a tool shaft 24 to which a tool bit (not shown) engaging with a bolt is installed, and a motor 12 that rotates the tool shaft, and a housing 14 that houses the motor 12. The housing 14 includes a housing body portion 16 that houses the motor 12 and the tool shaft 24, and a grip portion 18 extending from the housing body portion 16 in an approximately perpendicular direction to the housing body portion 16. The grip portion 18 is provided with a trigger switch 22 being an activating switch. The housing 14 and the trigger switch 22 are formed of a resin material.

Figure 2:
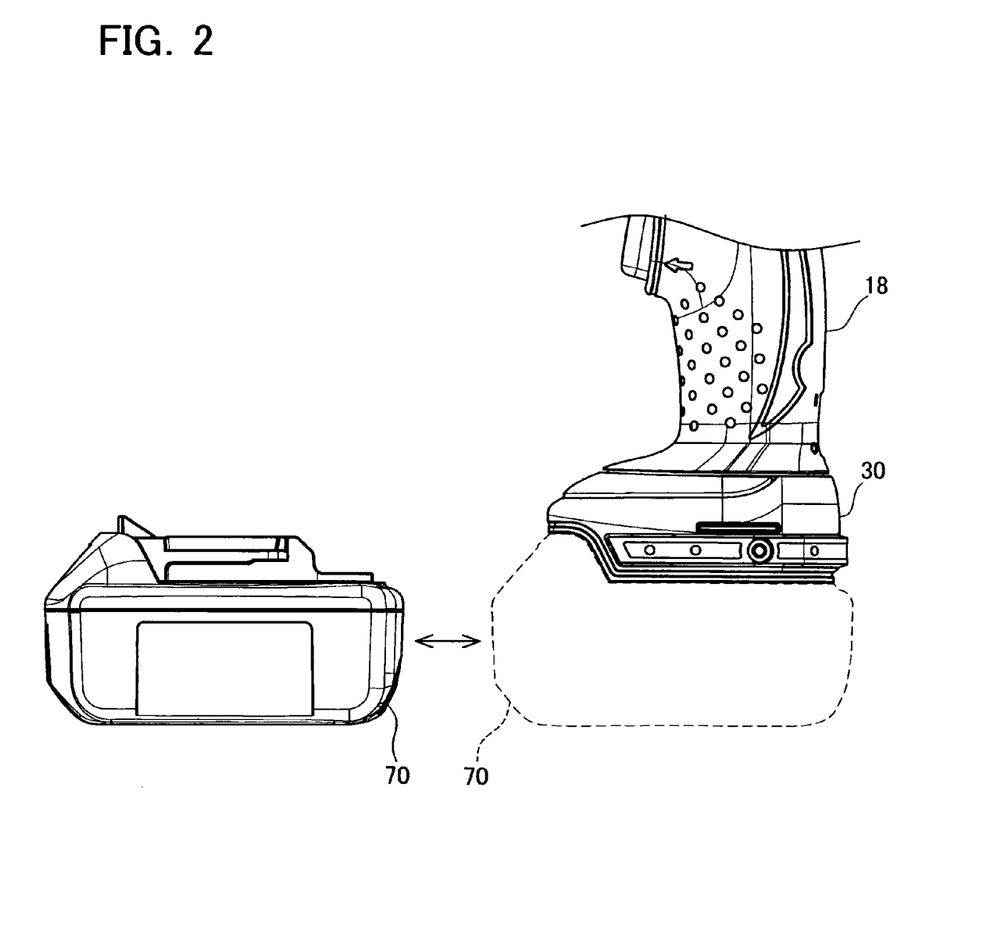
FIG. 2 shows how the battery pack is attached/detached.

A battery pack holder 30 is provided at a tip of the grip portion 18 (end portion opposite the housing body portion 16). As shown in FIG. 2, the battery pack holder 30 is constituted such that the battery pack 70 can be detached/attached from the front thereof (left side of FIG. 1 and FIG. 2). The electric power tool 10 is an electric power tool powered by the battery pack 70, and is operated by electric power from the battery pack 70 installed on the battery pack holder 30. The battery pack holder 30 is formed of the same resin material as the housing 14.

Figure 7:
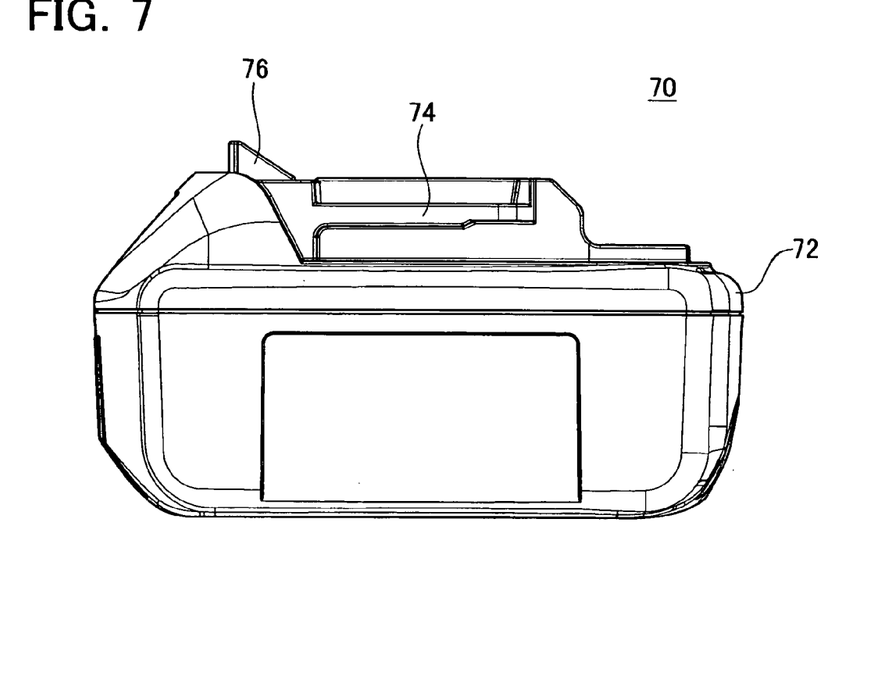
FIG. 7 is a side view of the battery pack.
Figure 8:
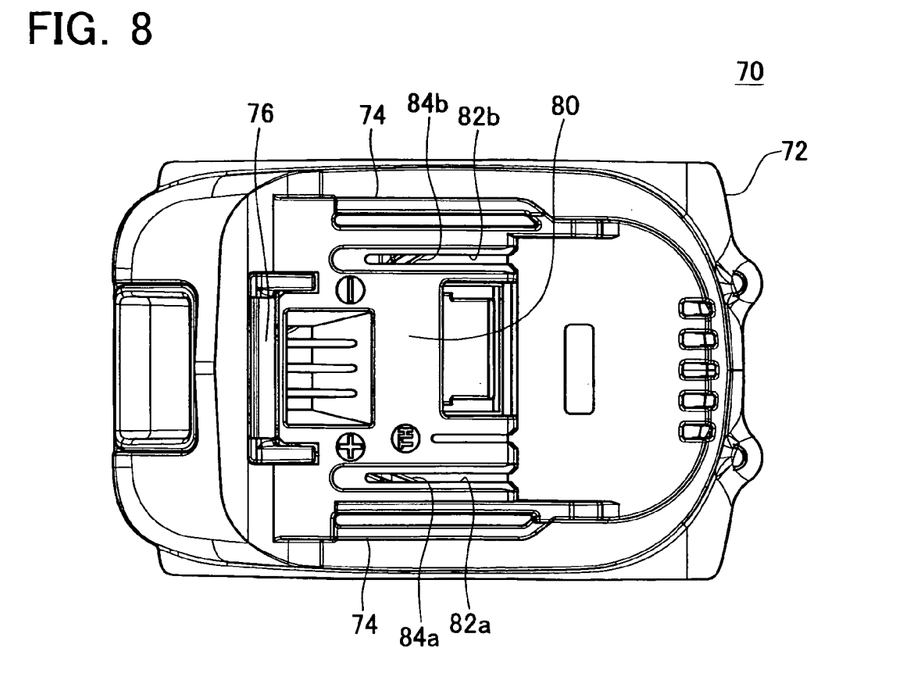
FIG. 8 is an upper surface view of the battery pack.

Before describing the electric power tool 10 in detail, a description will be made of the constitution of the battery pack 70 with reference to FIG. 7 and FIG. 8. FIG. 7 shows the side view of the battery pack 70, and FIG. 8 shows the top view of the battery pack 70. As shown in FIG. 7 and FIG. 8, the battery pack 70 includes a case 72 that houses a plurality of battery cells (not shown). A pair of rail portions 74 protruding laterally and a latch member 76 are provided on the upper portion of the case 72. The latch member 76 is energized upward by a spring member. Further, a terminal housing portion 80 that houses various electrical terminals is formed on the upper portion of the case 72. A plurality of slits 82a and 82b are formed on the terminal housing portion 80. A positive output terminal 84a is disposed inside one slit 82a. A negative output terminal 84b is disposed inside one slit 82b. The battery pack 70 can output the voltage of approximately 18 volts between the positive output terminal 84a and the negative output terminal 84b. Hereinafter, the positive output terminal 84a and the negative output terminal 84b may be generically called "output terminals 84a and 84b."

Figure 3:
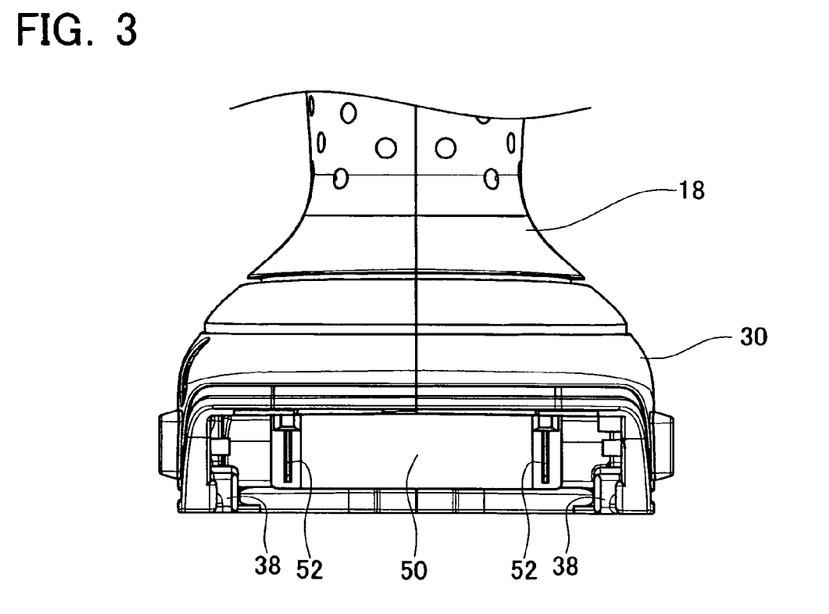
FIG. 3 is a front view of the battery pack holder.
Figure 4:
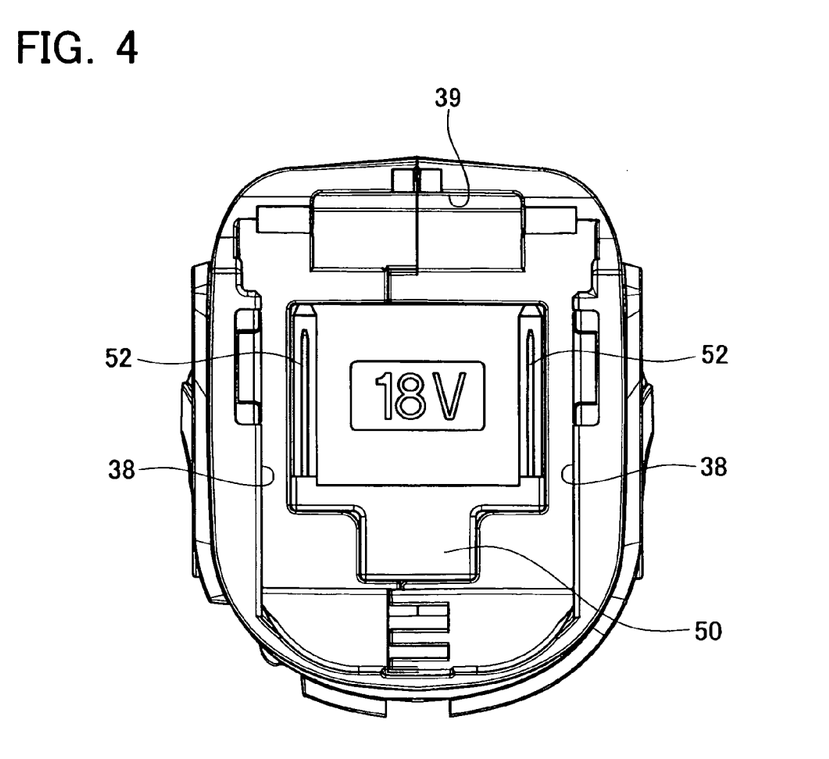
FIG. 4 is a bottom view of the battery pack holder.

Referring to FIG. 3 and FIG. 4, a description will be given of the constitution of the battery pack holder 30. FIG. 3 is the front view showing the battery pack holder 30 viewed from the front (left side of FIG. 1). Specifically, FIG. 3 shows the battery pack holder 30 viewed from an inserting direction of the battery pack 70. FIG. 4 is the bottom view showing the battery pack holder 30 viewed from the bottom. In FIG. 4, the battery pack 70 is inserted downward from above.

As shown in FIG. 3 and FIG. 4, a pair of rail portions 38 and an engaging concave portion 39 are formed on the battery pack holder 30. The pair of rail portions 38 extends in the inserting direction of the battery pack 70. The pair of rail portions 38 engages with the rail portions 74 of the battery pack 70, and can slidably support the battery pack 70. When the battery pack 70 is completely inserted into the battery pack holder 30 (the state shown in FIG. 1), the latch member 76 of the battery pack 70 engages with the engaging concave portion 39 of the battery pack holder 30, and thereby the battery pack 70 is fixed to the battery pack holder 30. As described, the battery pack holder 30 is provided with an engaging structure that fixes the battery pack 70 by engaging with the case 72 of the battery pack 70.

The battery pack holder 30 is provided with a terminal supporter 50. The terminal supporter 50 is fixed to the battery pack holder 30. A pair of connecting terminals 52 for connecting to the output terminals 84a and 84b of the battery pack 70 is formed on the terminal supporter 50. The connecting terminals 52 are electrically connected to the trigger switch 22 and the motor 12 inside the housing 14 via lead wires (not shown). Each of the pair of connecting terminals 52 is a metal plate-shaped member. The pair of connecting terminals 52 respectively enters into the slits 82a and 82b of the battery pack 70 when the battery pack 70 is inserted into the battery pack holder 30, and respectively contacts the output terminals 84a and 84b of the battery pack 70; and thereby the electric power tool 10 is electrically connected to the battery pack 70.

The output terminals 84a and 84b of the battery pack 70 are formed so as to be elastically deformed when in contact with the connecting terminals 52 of the battery pack holder 30. The connecting terminals 52 of the battery pack holder 30 and the output terminals 84a and 84b of the battery pack 70 are designed to contact with each other intensely due to the elastic force (restoring force) of the output terminals 84a and 84b.

Figure 5:
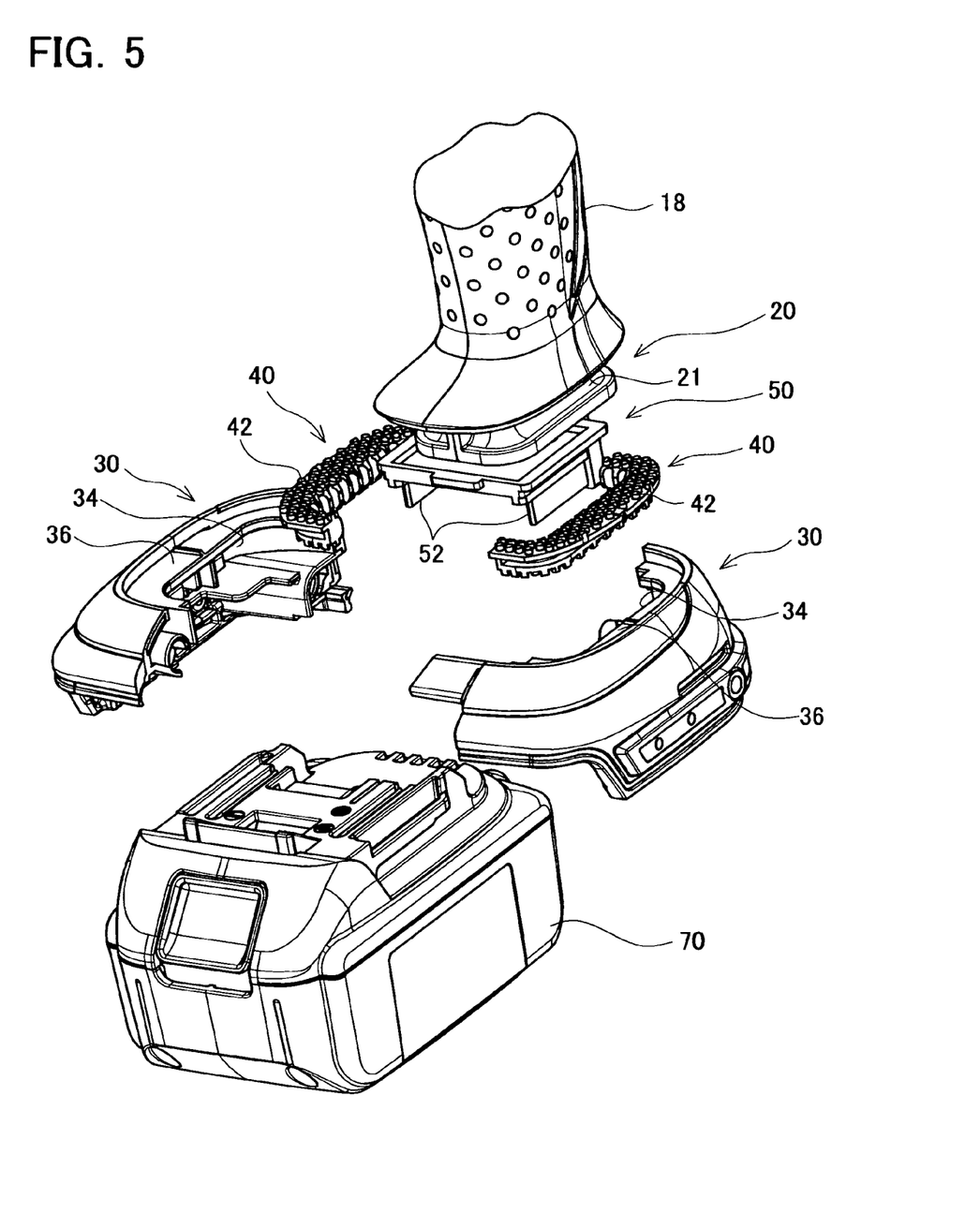
FIG. 5 shows an exploded view of the battery pack holder.
Figure 6:
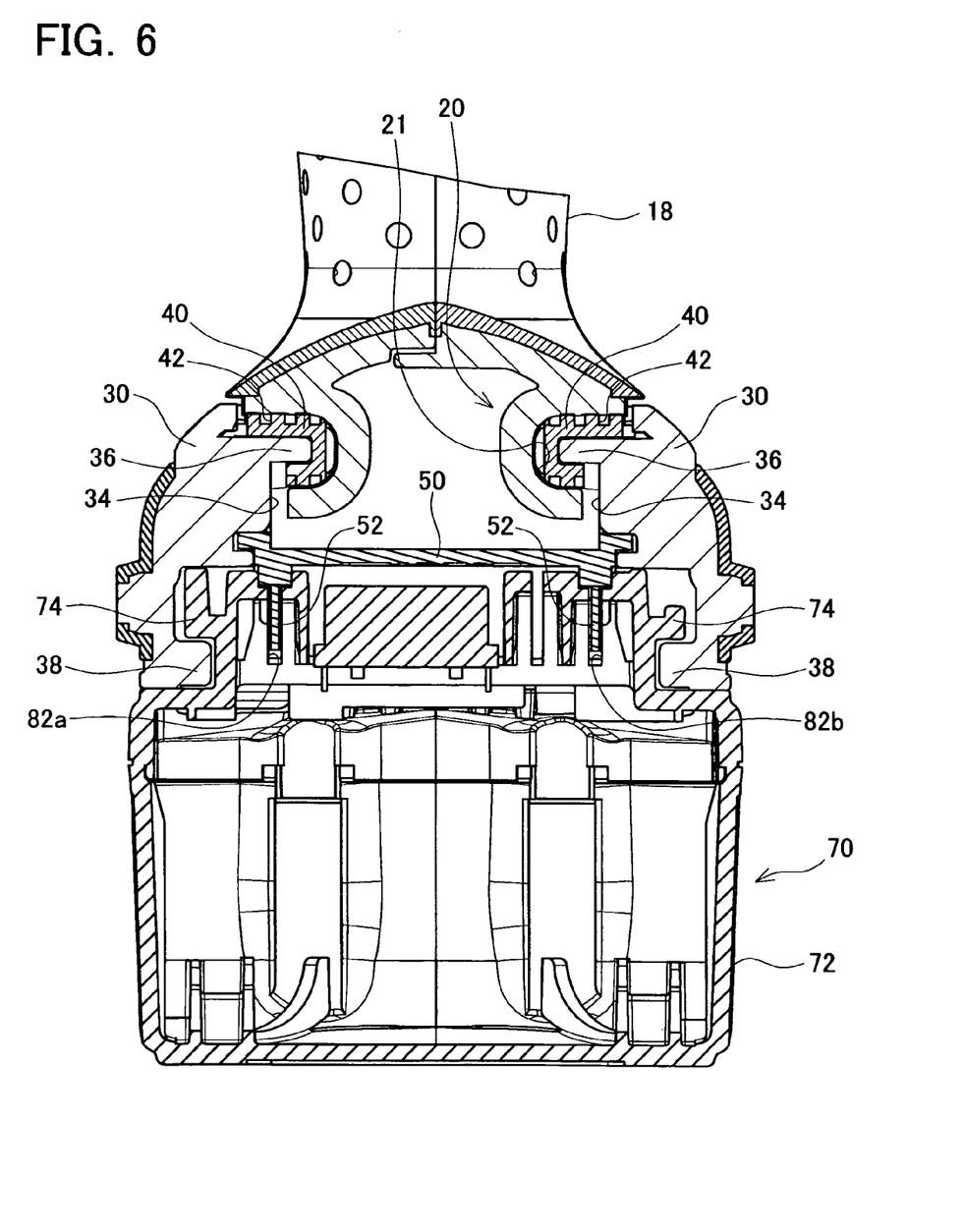
FIG. 6 is a line sectional view taken along VI-VI line in FIG. 1.

FIG. 5 shows the battery pack holder 30 in the exploded state. FIG. 6 shows the line sectional view of FIG. 1 taken by line VI-VI. As shown in FIG. 5 and FIG. 6, the battery pack holder 30 is constituted of different members from the housing 14, including the grip portion 18. Elastic members 40 are inserted between the housing 14 and the battery pack holder 30. With the deformation of the elastic members 40, the battery pack holder 30 is displaceable with respect to the housing 14.

Referring to FIG. 5 and FIG. 6, a description will be given in detail of a structure that connects the grip portion 18 of the housing 14 with the battery pack holder 30. A projected portion 20 is provided at the tip of the grip portion 18. A groove 21 is formed on the side surface and around approximately the entire projected portion 20. An insertion opening 34 into which the projected portion 20 is inserted is formed on the battery pack holder 30. An inward flange 36, which extends inward, is formed on the opening of the insertion opening 34. As shown in FIG. 6, a part of the inward flange 36 is housed inside the groove 21 of the projected portion 20 formed on the grip portion 18.

The elastic members 40 are disposed between the groove 21 of the projected portion 20 formed on the grip portion 18 and the inward flange 36 of the insertion opening 34 formed on the battery pack holder 30. The elastic members 40 cover the upper surface, the lower surface and the inner circumference of the inward flange 36. The elastic members 40 prohibit the battery pack holder 30 from directly contacting to the grip portion 18. The battery pack holder 30 is supported only by the elastic members 40, supported by the grip portion 18.

The elastic members 40 are formed of rubber material that is a kind of elastomer. The elastic member 40 has a rubber elasticity and a viscoelasticity. The elastic member 40, having rubber elasticity, can absorb considerable deformation in response to an applied force. Further, the elastic member 40, having viscoelasticity, can attenuate an energy applied in the deformation. Note that the elastic members 40 are not limited to the rubber material, but can be formed by another elastic material. However, the bodies are preferably formed by a polymeric material (not limited to the rubber material) having rubber elasticity of a larger deformation amount than that of the elastic material such as metal.

A plurality of projections 42 is formed on the surface of the elastic members 40. With the projections, the elastic members 40 can absorb further deformation in response to the applied force. A plurality of projections may be formed on the contact surface with the housing 14 of the elastic members 40 (specifically the groove 21) as described in this example, as well as on the contact surface with the battery pack holder 30.

As described above, in the electric power tool of this example, the battery pack holder 30 that holds the battery pack 70 is connected to the housing 14 via the elastic members 40 in order to prevent vibration transmission to the battery pack 70, even when vibration occurs in the housing 14 along with the operation of the motor and the tool. Without the intense vibration of the battery pack 70, damage to the case 72 of the battery pack 70, the battery cell, an inside circuit or the like can be prevented.

In the electric power tool 10 of this example, there is no intense vibration of the battery pack holder 30 or the battery pack 70, even when vibration occurs in the housing 14 during operation. Consequently, there is no significant change in a positional relationship between the connecting terminals 52 provided for the battery pack holder 30 or the output terminals 84a, 84b of the battery pack 70. Regardless of vibration occurrence in the housing 14 during operation, the connecting terminals 52 of the electric power tool 10 can maintain stable contact with the output terminals 84a and 84b of the battery pack 70. Further, without intense rubbing between the battery pack holder 30 and the case 72 of the battery pack 70, there is no thermal deformation of the battery pack holder 30 or the case 72 of the battery pack 70.

In the electric power tool 10 of this example, the elastic members 40 are surrounded by the battery pack holder 30, and thereby any contact of the elastic members 40 with the battery pack 70 or an external object is prevented. Further, direct irradiation of sunlight or the like is also prevented to ensure there is no physical damage or chemical alternation of the elastic members 40.

The specific embodiment of the present invention is described above, but this merely illustrates some possibilities of the invention and do not restrict the claims thereof. The art set forth in the claims includes transformations and modifications to the specific examples set forth above.

The above-described examples employ a structure in which the groove 21 is formed on the projected portion 20 provided for the housing 14, the inward flange is formed on the insertion opening 34 provided for the battery pack holder 30, and the elastic members 40 are disposed therebetween. The structure may be changed as follows. Specifically, an outward flange is formed on the projected portion 20 provided for the housing 14, a groove into which the outward flange is inserted is formed on the insertion opening 34 of the battery pack holder 30, and the elastic members 40 are disposed therebetween. In this structure as well, the battery pack holder 30 is connected to the housing 14 via the elastic members 40, and thereby vibration of the battery pack 70 is prevented.

Further, the design can be changed in the way the structure provided for the housing 14 and the structure provided for the battery pack holder 30 switch with each other. In other words, the projected portion may be formed on the battery pack holder 30, and simultaneously the insertion opening into which the projected portion may be inserted can be formed on the housing 14.

Furthermore, the technical elements disclosed in the present specification or figures may be utilized separately or in all types of conjunctions and are not limited to the conjunctions set forth in the claims at the time of filing the application. Furthermore, the art disclosed in the present specification or figures may be utilized to simultaneously realize a plurality or one of a plurality of aims.

What is claimed is:

1. A portable electric power tool powered by a battery pack, comprising:
   a motor that drives a tool bit;
   a housing that houses the motor;
   at least one elastic member that is supported by the housing; and
   a battery pack holder that is separated from the housing and is supported by the elastic member,
   wherein the battery pack holder includes an engaging portion that detachably engages with a case of the battery pack and connecting terminals that are electrically connected to output terminals of the battery pack attached by the engaging portion,
   a projecting portion is formed on either the housing or the battery pack holder, and an insertion opening into which the projecting portion is inserted is formed on the other of the housing or the battery pack holder;
   a flange portion is formed on a side surface of either the projecting portion or the insertion opening, and a groove portion that houses the flange portion is formed on a side surface of the other of the projecting portion or the insertion opening; and
   the at least one elastic member is arranged between the flange portion and the groove portion.

2. A portable electric power tool as in claim 1, wherein:
the housing includes a body portion that houses the motor and a grip portion that extends from the body portion; and
the battery pack holder is attached to an end of the grip portion via the elastic member.

3. A portable electric power tool as in claim 2, wherein the elastic member is surrounded by at least one of the housing and the battery pack holder.

4. A portable electric power tool as in claim 3, wherein the elastic member is formed of elastomer.

5. A portable electric power tool as in claim 4, wherein at least one of a plurality of projections and a plurality of depressions is formed on the surface of the elastic member.

6. A portable electric power tool as in claim 5, wherein the elastic member prohibits the battery pack holder from directly contacting to the housing.

7. A portable electric power tool as in claim 1, wherein the elastic member is surrounded by at least one of the housing and the battery pack holder.

8. A portable electric power tool as in claim 1, wherein the elastic member is formed of elastomer.

9. A portable electric power tool as in claim 1, wherein at least one of a plurality of projections and a plurality of depressions is formed on the surface of the elastic member.

10. A portable electric power tool as in claim 1, wherein the elastic member prohibits the battery pack holder from directly contacting to the housing.

* * * * *